Patented Apr. 16, 1929.

1,709,605

UNITED STATES PATENT OFFICE.

EDGAR C. BRITTON, OF MIDLAND, MICHIGAN, ASSIGNOR TO THE DOW CHEMICAL COMPANY, OF MIDLAND, MICHIGAN, A CORPORATION OF MICHIGAN.

METHOD OF MAKING ETHYLENE GLYCOL.

No Drawing. Application filed May 21, 1923. Serial No. 640,612.

The general method for the preparation of ethylene glycol is based upon the hydrolysis of ethylene halides or halohydrins. When a halohydrin is used, a somewhat higher cost is involved than when such a halide is employed, considerable difficulty being encountered in bringing about a total hydrolysis to ethylene glycol without the formation of ethylene itself or of vinyl halides. The process best known in organic laboratories consists in boiling ethylene dibromide with potassium carbonate solution in order thus to bring about the hydrolysis of the former; but this procedure is exceedingly long and as indicated requires the relatively expensive potassium carbonate to effect even a 60 per cent yield (see Zeller & Heffner, Jour. fur prakt. Chem. 1875, (2), 11, 231). More recently it has been proposed to prepare ethylene glycol from ethylene halides by the action of sodium acetate, sodium phosphate, etc. (see Chem. Zentralblatt 1923, II, 476, and Bayer & Co. British Patent No. 177,362 of 1921). A temperature of 165 degrees C. and above is required for this reaction; in fact, water alone will bring about the hydrolysis of either the dichloride or dibromide at 170 degrees C. or at lower temperatures if heated for many hours (Jelticow, Ber. 6, 158). However in all these cases, it must be understood that the glycol which is the object of the process performed is itself decomposed when heated with water in the neighborhood of 200 degrees C. and that this decomposition proceeds even at lower temperatures when the heating is continued for any length of time.

I have now discovered, however, that a speedy and complete hydrolysis of ethylene halides at a temperature of not to exceed 160 degrees C., and preferably in a closed container and at a pressure correspondingly elevated, may be effected by reacting thereon with sodium carbonate, sodium borate, sodium phosphate, and in general the salts of strong bases and weak acid; in fact, an hour's heating will amply suffice for a complete reaction. To the accomplishment of the foregoing the invention then consists of the steps hereinafter fully described and particularly pointed out in the claims, the following description setting forth but several of the various ways in which the principle of the invention may be carried out.

In the case of ethylene dichloride the replacement of the first chlorine by a hydroxyl group is considerably more difficult than the replacement of the second chlorine; on the other hand, with ethylene dibromide, both bromine atoms are easily replaced by hydroxyl groups. I have found, however, that ethylene chlorobromide offers a particular advantage for the rapid production of ethylene glycol in that the first step, which consists in the replacement of bromine by hydroxyl is of easy accomplishment and the second step or the replacement of chlorine by hydroxyl from the intermediate form, ethylene chlorohydrin, is also readily accomplished even at a temperature as low as 100 degrees C. Furthermore, by removal of the precipitated salt from the reaction mixture it is possible to introduce additional quantities of ethylene halides and sodium carbonate into the system and thus increase the concentration of ethylene glycol in the final mixture. The comparatively low temperature of the reaction substantially entirely avoids the usual decomposition of the glycol that occurs in the presence of hot water.

The foregoing will indicate substantially the steps to be followed in carrying out my improved process or method but the following is given by way of specific example:—

Approximately 2 parts by weight of ethylene chlorobromide and 3 parts of sodium carbonate are heated in a closed container with 29 parts of water at a temperature of 145° C., and such temperature maintained for 4 hours. The reactions that occur may be represented by the following equations, viz:

(1) $Cl.C_2H_2Br + 2HOH =$
$\qquad HO.C_2H_4OH + HCl + HBr.$ (2) $2Na_2CO_3 + HCl + HBr =$
$\qquad 2NaHCO_3 + NaCl + NaBr.$ If, instead of 2 molecules of the carbonate only one is used, the second equation becomes (3) $Na_2CO_3 + HCl + HBr =$
$\qquad CO_2 + NaCl + NaBr. + H_2O.$ In the first case, no excess pressure is produced in the apparatus, the acid carbonate with the sodium salts going into solution, while in the latter case provision has to be made to vent the carbon dioxide given off. In either event, the ethylene glycol is readily separated from such solution by familiar methods.

I have found that there is always a slight amount of decomposition product accompanying the hydrolysis of either ethylene dibromide or ethylene dichloride. The lesser amount accompanies the dichloride. In the hydrolysis of ethylene chlorobromide there has never been found any product other than ethylene glycol. In other words, I have obtained 100 per cent yield of glycol on the chlorobromide converted.

Other modes of applying the principle of my invention may be employed instead of the one explained, change being made as regards the method herein disclosed, provided the step or steps stated by any of the following claims or the equivalent of such stated step or steps be employed.

I therefore particularly point out and distintly claim as my invention:—

1. The method of making ethylene glycol, which comprises heating an ethylene dihalide containing two different halogens, in the presence of water and a salt of a strong base and weak acid at a temperature substantially avoiding decomposition of glycol.

2. The method of making ethylene glycol, which comprises heating ethylene chlorobromide in the presence of water and a salt of a strong base and weak acid at a temperature substantially avoiding decomposition of glycol.

3. The method of making ethylene glycol, which comprises heating at not over 160° C., an ethylene dihalide containing two different halogens, in the presence of water and sodium carbonate.

4. The method of making ethylene glycol, which comprises heating at not over 160° C. ethylene chlorobromide in the presence of water and sodium carbonate.

5. The method of making ethylene glycol, which comprises heating at not over 160° C., one mol. of ethylene chlorobromide and two mols. of sodium carbonate, in the presence of water.

6. The method of making ethylene glycol, which comprises hydrolyzing at a temperature not over 160° C. an ethylene dihalide containing two different halogens.

7. The method of making ethylene glycol, which comprises heating at not over 160° C. an ethylene dihalide containing two different halogens, in the presence of water and an alkali carbonate.

Signed by me, this 18th day of May, 1923.

EDGAR C. BRITTON.